F. T. BAIRD.
BATTERY SEPARATOR.
APPLICATION FILED NOV. 19, 1917.
1,279,074.
Patented Sept. 17, 1918.
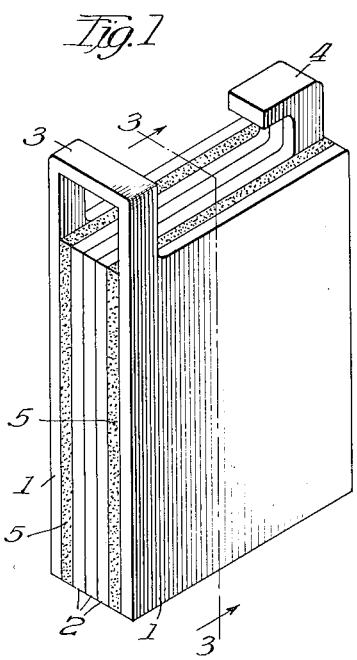
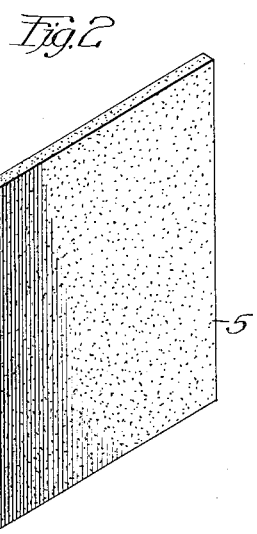
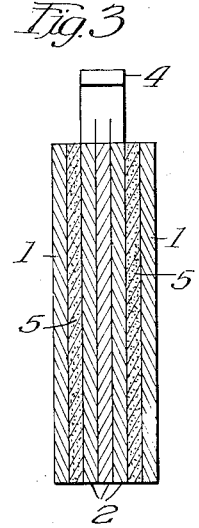
Inventor
Frank T. Baird
By Cheever & Cox
Attys

UNITED STATES PATENT OFFICE.

FRANK T. BAIRD, OF BLUE ISLAND, ILLINOIS.

BATTERY-SEPARATOR.

REISSUED 1,279,074.

Specification of Letters Patent.

Patented Sept. 17, 1918.

Application filed November 19, 1917. Serial No. 202,720.

*To all whom it may concern:*

Be it known that I, FRANK T. BAIRD, a citizen of the United States, residing at Blue Island, in the county of Cook and State of Illinois, have invented a certain new and useful Battery-Separator, of which the following is a specification.

My invention relates to separators for storage batteries. Various characteristics are desirable in a separator, for example, it is desirable that it shall be highly permeable to the electrolyte. This, among other things, gives low internal resistance to the battery. It is desirable that it shall have high absorptive properties, thus enabling it, when used in a dry battery, to retain in itself a sufficient quantity of the electrolyte to enable the battery to function efficiently and to prevent the liquid from running out in case the cell is overturned or punctured. It is desirable that it shall be porous so that it may be readily washed. It is desirable that it shall be soft enough not to injure the battery plates nor tend to remove the active material from them. It is desirable also that it shall be simple to manufacture, inexpensive, and made from material easy to obtain. I have discovered that a separator combining the mentioned characteristics may be obtained by making it of tripoli as will be explained.

While the separator and battery in which it is used may assume various forms, I have illustrated a suitable one in the accompanying drawings, in which:

Figure 1 is a perspective view of the positive and negative plates of a battery showing my separators in position.

Fig. 2 is a perspective view of the form of separator used in this particular type of battery, and Fig. 3 is a sectional view taken on the line 3, 3, Fig. 1.

In the drawings, similar parts are indicated by similar reference characters in the several views.

To describe the particular style of battery shown in the drawings: The outer plates 1, 1 are negative and the inner ones 2 positive. These consist usually of lead having suitable active material upon their surfaces. The negative plates are connected by a lug 3 and the positive plates are here shown to be formed in three layers, connected by a lug 4. The separators 5 are interposed between the positive and negative plates and, by preference, are substantially equal to them in size. They are composed of a material technically known as "tripoli" which is defined as a siliceous deposit almost wholly of the shells of diatoms and occurring in friable masses or earthy form. I have discovered that this material is capable of absorbing sufficient electrolyte to permit portable batteries to discharge effectively for as long a period as can be expected from most commercial dry cells in which the electrolytic liquid is present in such quantities that it will run out in case any opening is made in the shell or jacket. In other words, a battery using my separators does not contain electrolyte which is free in the sense of being able to be drained off in case of puncture. The electrolyte is present in adequate quantity but is held absorbed by the separators.

My separators are usually formed by sawing them from masses of tripoli in the native state. No treatment of any kind is ordinarily required. The tripoli itself is found in large quantities in Missouri and other States of the United States in a very pure state and exhibiting the characteristics which are so valuable and which render my battery so efficient.

It is well known that in the ordinary dry battery, as soon as the electrolyte liquid has been drained off, the battery loses its efficiency, if not most of its ability to function at all. In a battery employing my separator on the contrary, the cell will continue to function as long as may be expected from any so-called "dry" cell. I have discovered, furthermore, that tripoli has such porosity as to present very low resistance, the result being that a battery employing this material as a separator has low internal resistance. I have also discovered that after the battery has been apparently discharged (so far as ordinary practical conditions are concerned) and the voltage has dropped to about 1.5 volts, a considerable added period of service may be obtained by pouring fresh water upon the separators; for example, when the battery has discharged to about 1.5 volts, by removing the separators and pouring fresh (preferably distilled) water upon them and reassembling the battery, an additional service of one and one-half hours may be obtained from a small portable battery without recharge.

The effect of the ordinary electrolyte upon the tripoli separator seems to be to soften the surface. Such a separator, therefore, is easy upon the battery plates in the sense that it does not abrade the plates or tend to remove the active material from their faces. The plates themselves, therefore, last much longer with my separators than with others having harder or more abrasive surfaces.

Batteries constructed in the manner described and employing separators of tripoli may be recharged by connecting them in a charging circuit in the same manner as is employed in the re-charging of wet batteries. I have found that the constituency of tripoli is such that it distributes the electrolyte over the entire area of the separator, thus making for efficiency in the battery. As a result of my invention or discovery, I am able to produce a battery and separator easily and cheaply from materials which occur abundantly close at hand in a state of nature. I am also able to procure a battery which will not leak or drip in case the shell or casing is punctured or inverted, and will recuperate for an additional period of service by merely washing the separators or permitting fresh water to flow upon them. The internal resistance is held at a low point and distribution of the electrolyte throughout the area of the separator is uniform, owing, I believe, to the capillary characteristics of the material.

Having thus described my invention, what I claim as new and desire to secure by Letters Patent, is:

1. A battery separator formed of tripoli.
2. A separator for storage batteries formed by sawing tripoli in its native state into slabs or sheets.

In witness whereof, I have hereunto subscribed my name.

FRANK T. BAIRD.